United States Patent Office 3,549,723
Patented Dec. 22, 1970

3,549,723
PROCESS FOR MAKING LINEAR ALPHA OLEFINS
Dimitrios V. Favis, Sarnia, Ontario, Canada, assignor to Esso Research and Engineering Company, a corporation of Delaware
No Drawing. Filed Mar. 13, 1967, Ser. No. 622,453
Int. Cl. C07c 3/10
U.S. Cl. 260—683.15
9 Claims

ABSTRACT OF THE DISCLOSURE

Ethylene is polymerized to obtain liquid linear alpha olefins, said polymerization taking place over a catalyst system comprising (1) a compound selected from the group consisting of (a) alkyl compounds of a metal selected from Groups I to III of the Periodic Table, and (b) compounds as described in (a) wherein one or more, but not all, alkyl groups are replaced with a halogen; (2) a transition metal halide; and (3) a compound selected from the group consisting of a tertiary halide and monochloro alkyl cyclopentene, and in the presence of recycled lower molecular weight olefins, selected from a group consisting of $C_6$, $C_8$, $C_{10}$, and $C_{12}$ olefins and mixtures thereof, the presence of which serves to increase the production of the desired heavier liquid olefins.

BACKGROUND OF THE INVENTION

Field of the invention

This invention pertains to a process of making liquid linear alpha olefins in a selected carbon fraction range by utilizing a particular catalyst and recycle olefin.

Description of the prior art

It is well known in the prior art that normal alpha olefins can be synthesized from ethylene by the so-called aluminum alkyl growth, Ziegler reaction. This reaction is stoichiometric in that, at most, only 3 molecules of olefin per molecule of aluminum alkyl are obtained. While the aluminum alkyls may be physically or chemically recovered in situ, during the reaction (Belgian Pat. 625,002; U.S. Pat 3,160,672) or recycled by the utilization of displacement and distillation techniques, so that their consumption is reduced to catalytic amounts, the economics of such processes for producing olefins have prohibited their commercial acceptance. Various attempts have therefore been made to produce n-1-olefins from ethylene using Ziegler type catalytic oligomerizations. U.S. Pats. 3,097,246 and 3,136,824, for example, described modified catalyst systems which may be employed to obtain telomerization of ethylene and aromatic compound thereby forming alkylated aromatic products.

SUMMARY OF THE INVENTION

This invention is directed to a process of catalytically polymerizing ethylene to produce liquid alpha olefins having a particular carbon number range which comprises the utilization of a catalyst produced by the interaction of ethylaluminum chlorides with titanium tetrachloride in the presence of ferrocene and linear alpha olefins (called recycle olefin) as a diluent.

DESCRIPTION OF THE PREFERRED EMBODIMENTS

It is now known (U.S. patent application Ser. No. 458,745 filed May 25, 1965, now U.S. Pat. 3,472,910, granted Oct. 14, 1969) that by modification of the catalyst systems described in the above-mentioned patents as well as by critical control of reaction conditions such as pressure and catalyst concentration, it is possible to catalytically synthesize linear alpha olefins from ethylene.

Specifically, it has now been shown that the utilization of ferrocene as an additional catalyst modifier and the careful control of ethylene concentration by regulation of the pressure, in the presence of selected diluents, results in a polymerization process which is highly selective for the production of low molecular weight linear alpha olefins.

The catalyst system which can be used in this invention comprises (1) an alkyl compound of a metal of Groups I to III of the Periodic Table; (2) a halide of a transition metal of Groups IV–B, V–B, VI–B and VIII of the Periodic Table; (3) an alkyl halocycloalkane; and ferrocene.

The metal alkyl components of the catalyst system have the following general formula: RR′R″Me; wherein R is a phenyl or alkyl group having 1 to 24 carbon atoms, either straight or branched chain. Preferably, R is a lower alkyl and more preferably a $C_1$ to $C_6$ alkyl. Where the valence of the metal is two or greater, then R′ is the same as R or may be a halogen chosen from I, Br and Cl or H. R′ may represent nothing in the event the metal has a valence of only one. Where the valence of the metal is three. R″ will have the same definition as either R or R′. The "Me" portion of the metal alkyl component is a metal of Groups I to III of the Periodic Table such as Li, Na, K, Mg, Ca, Sr, Va, Al, Ga and In; with Al preferred. The preferred metal alkyl component of the catalyst system is triethylaluminum although diethylaluminum chloride and ethylaluminum dichloride have also been found to be highly advantageous. Other metal alkyl compounds which may be employed include dipropylaluminum chloride, triisobutylaluminum, diethylaluminum hydride, ethyl butylhexylaluminum, diethylaluminum chloride, dibutylaluminum chloride and ethylaluminum dichloride. Many other metal alkyl compounds of this general class are also employable with good results.

The metal halide component of the catalyst system has the following general formula: $MX_a$ where M equals a transistion metal of Groups IV–B, V–B, VI–B and VIII of the Periodic System such as Ti, Zr, V, Cr, Mo, W and Fe, preferably Ti; X equals a halide, preferably Cl; and small a equals valence of M, e.g. 2 to 4. The preferred compound is titanium tetrachloride. Examples of other metal halide which may be employed include $ZrCl_4$, $VCl_4$ and $CrCl_3$.

The third component of the catalyst is an alkyl halocyclopentane having the formula:

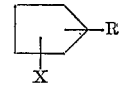

where R equals a straight or branched chain alkyl group having from 1 to 10 carbon atoms, preferably methyl; and X equals a halogen, preferably Cl. The preferred compound is methylchlorocyclopentane. Tertiary chlorides, i.e.,

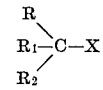

wherein R, $R_1$ and $R_2$ represent hydrocarbon radicals such as methyl, ethyl, propyl, phenyl, etc., are moderately effective and may be employed in lieu of the alkylhalocyclopentane if desired.

The fourth component of the catalyst system is a ring metal, "sandwich" type of organo metallic compound. The preferred compound is ferrocene having a formula

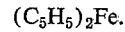

Examples of other compounds in this class include $Cp_2Ti$, $Cp_2Cr$, $Cp_2Co$, $Cp_2Ni$, $Cp_2TiCl_2$ and other metallocenes, preferably those having a valency changing metal, where Cp is a cyclopentadiene based group, e.g., $(C_5H_5)$.

The optimum mole ratio of the metal alkyl compound to metal halide is interrelated with the molar ratio of the modifier to metal alkyl. However, it should be no lower than 1.0 and preferably higher than 1.2 and of a level providing a polymerization reaction having a reasonable degree of reactivity. It should be emphasized that optimum ranges of the molar ratio of these components are also interrelated with the concentration of the metallocene, i.e., ferrocene. Low metal-alkyl to metal halide ratios can be employed provided that higher concentrations of metallocene are used. In addition, the quantity of alkylhalocyclopentane must be maintained lower than 0.99 mole per mole of alkyl radical of the metal aky compound, and preferaby between 0.3 and 0.7. The molar ratio of metallocene, i.e., ferrocene, component over the triethylaluminum will depend on the ratio of titanium tetrachloride; however, it should be normally ranged from 0.001 to 1.0 and preferably between 0.02 to 0.2. The four-component catalyst may be employed in amounts corresponding to less than 0.2 grams of triethylaluminum per 100 grams of total reaction product. Since catalyst and ethylene concentrations are interrelated, critical variables of the reaction optimum amounts can further be determined experimentally with a reasonable degree of expectancy. Normally, the preferred amount of all four components of the catalyst system is in the range of 0.1 to 2.0 grams per 100 grams of reacted ethylene, or the same, of total reaction products.

It should, however, be emphasized that the main controlling variables of this obligomerization reaction are ethylene and catalyst concentrations. It has been demonstrated, U.S. Pat. No. 3,472,910, that other Ziegler type ethylene oligomerization catalytic systems such as those produced by interaction of ethylaluminum chlorides with titanium tetrachloride can directionally produce n-l-olefins from ethylene under appropriate ethylene and catalyst concentrations.

Ethylene is unique in the instant invention that other olefins do not respond to give similar products. Ethylene feeds containing minor amounts of other olefins may be used provided that the extent of copolymerization does not significantly decrease product linearity.

It has now been found that by modifications of the process for producing high purity linear alpha olefins, the process can be made selective for particular carbon range fractions. By the present a solvent comprising a certain amount of n-l-olefin, thereby called recycle olefin, having a certain carbon number range, is employed in order to obtain a selectivity of the reaction to net products having a desirable carbon range, such as for example those of $C_{12}$–$C_{22}$, higher than that normally obtained by a reaction without recycle n-l-olefin. In the practice of this process the amount of the net reaction product having a desired carbon range is proportional to the amount of the recycle olefin used, considering of course, certain upper limits, if any, of recycle olefin concentrations which can be determined by direct experimental work.

The process of this invention is, in addition to the recycle olefin, normally carried out in the presence of an inert diluent. The effect of diluent on the reaction system is critical since ethylene adsorbability, molecular weight and type of olefin product are affected by the choice of diluent. Aromatic diluents such as benzene, xylene and toluene are preferred diluents, the latter two being most preferred. Paraffin and cycloparaffin solvents exhibit poor ethylene adsorbability and yield reaction products predominantly composed of high molecular weight polymers.

The reaction conditions are critical to this process. As stated previously in this application, the ethylene concentration, as represented by the ethylene pressure, in the process must be controlled within critical limits if high yields of linear alpha olefins in the desired molecular weight range are to be obtained. Thus the ethylene pressure will normally be maintained between 0 and 2,000 p.s.i.g., preferably 100 to 600 p.s.i.g., e.g., 350 to 550 p.s.i.g. The upper limit of pressure is critical since the reaction at pressures higher than 2,000 p.s.i.g. has the tendency of producing large quantities of high molecular weight polyethylenes. Reaction temperatures will normally be maintained between —130° and 130° F., preferably —40° to +70° F. Reaction times can be critical, when operating under the other preferred conditions of the reaction, and they depend on the amount of recycle olefin as well as on the weight ratio of the amount of the recycle olefin used to the amount of total reaction product.

In a typical embodiment of this invention, the catalyst components, in proper proportion, are introduced into a reactor containing an appropriate diluent and 10 to 90 weight percent olefin e.g., 25 to 50 weight percent recycle olefin. The catalyst components are thoroughly mixed, and the reaction system is brought to the proper temperature of reaction. Ethylene, under the appropriate pressure, is introduced into the reactor for a time sufficient to complete the polymerization reaction. Upon completion of the reaction, the reaction mixture may be treated with water to destroy the catalyst. The removal of ferrocene from the hydrocarbon phase may be accomplished by treatment of the hydrocarbon phase with any of various oxidants such as HCl, $N_2O_2$ and $HNO_3$ or by adsorption with silica gel, clay and the like. The hydrocarbon phase containing the decomposed catalyst and adsorbent is filtered and the filtrate is thereafter distilled to remove diluent. The product may then be further distilled to obtain the desired smear of product olefins. Thus, for example, the product boiling in the range of 400/700° F. ($C_{12}$–$C_{22}$) may be recovered by such fractionation and thereafter further treated, for example, by sulfonation, to produce useful detergents.

The invention will be further understood by the following illustrative examples.

EXAMPLE 1

One hundred cc. of xylene purified and dried over 5A $\frac{1}{16}''$ molecular sieves were introduced into a stirred 500 cc. Pyrex glass reactor blanketed with nitrogen. To this, 4.8 cc. of 25 weight percent triethylaluminum in n-heptane solution, plus small quantities of Cl-MCP, corresponding to 1.86 moles per mole of triethylaluminum used, were added. These components interact resulting in a yellowish solution, the color of which disappears within about five minutes. At this stage titanium tetrachloride was added in amounts corresponding to 0.50 mole per mole of triethylaluminum used. The resultant red solution was stirred for about 5 minutes and then half of the solution volume was removed and disposed. The remaining portion was diluted with xylene to about 400 cc. and then ferrocene, dissolved in benzene, was added in an amount corresponding to .24 mole per mole of triethylaluminum used. The above operations were carried out at temperatures generally below 70° F. The suspension was introduced to a one liter autoclave, blanketed with nitrogen and equipped with Teflon or glass-coated stainless steel surfaces and a carbon steel cooling coil. The suspension was cooled to 20° F. which was the normal temperature of the reaction. Finally, ethylene was introduced to a pressure of 400 p.s.i.g. which was the normal reaction pressure. The reaction time was four hours. After completion, the reaction mixture was hydrolyzed with water. This processing step is referred to as deactivation. The hydrocarbon phase was separated, filtered to remove suspended solid materials and then analyzed by gas chromatography using a 10-foot silicon gum rubber column. The results are shown in Table I. It will be seen that the reaction, defined as "ordinary" gave a $C_{12}$–$C_{22}$ range fraction in 38.7 weight percent on total product yield, containing 87.9 weight percent n-l-olefin. Henceforth, weight percent of n-l-olefin content will be referred to as linearity. The linearity of the remaining xylene soluble products was at least equal to that of the $C_{12}$–$C_{22}$ fraction. Linearities, throughout this application, do not include mass 188, a byproduct formed by interaction of species derived from the decomposition of catalyst components. The concentration of this impurity in the reaction products depends on the amount of catalyst used and can be as low as less than 1 weight percent of the $C_{12}$–$C_{22}$ fraction. Experimental work carried out in our laboratory showed that mass 188 can be removed from the product by silica gel contacting. (Cl-MCP is monochloro-methylcyclopentane.)

deactivation rather than to copolymerization during the course of the reaction.

EXAMPLE 4

A reaction without recycling was carried out using a catalyst having the same component composition as that used in Example 1. The weight ratio of the xylene diluent to the weight of the triethylaluminum was 870. The reaction was conducted at 15° F., 400 p.s.i.g. ethylene pressure for a time of about 240 minutes. From the carbon number distribution shown in Table II, it can be seen that 44.2 weight percent of the product had a carbon

TABLE I

|  | Example 1 | | | Example 2 | | | Example 3 | | |
|---|---|---|---|---|---|---|---|---|---|
| Wt. percent n-1-olefin in diluent | Nil | | | 9.0 | | | 14.3 | | |
| Yield $C_{12}$–$C_{22}$ olefin (percent of product) | 38.7 | | | 29.6 | | | 53.0 | | |
| $C_{12}$–$C_{22}$ olefin wt. percent | 87.8 | | | 81.5 | | | 92.3 | | |
| Reaction pressure (p.s.i.g.) | 400 [1] | | | 210 | | | 400 | | |
|  | Olefin carbon distribution, weight percent | | | Olefin carbon distribution, weight percent | | | Olefin carbon distribution, weight percent | | |
|  | Of the "Recycle" n-1-olefin | After the reaction | Net product | Of the "Recycle" olefin | After the reaction | Net product | Of the "Recycle" olefin | After the reaction | Net product |
| $C_4$ | Nil | 5.8 | 5.8 |  | 6.6 | 8.6 | 1.0 | 1.3 | 1.8 |
| $C_6$ | Nil | 15.4 | 15.4 | 100 | 40.1 | 23.0 | 25.4 | 13.2 | 5.6 |
| $C_8$ | Nil | 15.7 | 15.7 |  | 16.8 | 22.2 | 37.4 | 20.9 | 10.5 |
| $C_{10}$ | Nil | 12.8 | 12.8 |  | 12.0 | 15.9 | 23.8 | 15.8 | 11.0 |
| $C_{12}$ | Nil | 11.1 | 11.1 |  | 8.1 | 10.7 | 5.0 | 9.0 | 11.3 |
| $C_{14}$ | Nil | 9.7 | 9.7 |  | 5.6 | 7.4 | 0.9 | 7.3 | 11.1 |
| $C_{16}$ | Nil | 7.4 | 7.4 |  | 4.2 | 5.6 | 0.2 | 6.8 | 10.7 |
| $C_{18}$ | Nil | 4.8 | 4.8 |  | 2.1 | 2.7 |  | 5.0 | 8.2 |
| $C_{20}$ | Nil | 3.4 | 3.4 |  | 1.4 | 1.8 |  | 4.0 | 6.5 |
| $C_{22}$ | Nil | 2.3 | 2.3 |  | 1.0 | 1.4 |  | 3.2 | 5.2 |
| $C_{24}$ | Nil | 1.7 | 1.7 |  | 0.3 | 0.4 |  | 2.8 | 4.7 |
| $C_{26}$ | Nil | 1.2 | 1.2 |  | 0.2 | 0.3 |  | 1.9 | 3.2 |
| $C_{28}$ | Nil | 1.8 | 1.8 |  | Trace | Trace |  | 1.6 | 2.6 |
| $C_{30}$ | Nil | 1.1 | 1.1 |  |  |  |  | 1.5 | 2.4 |
| $C_{32}$ | Nil | 3.2 | 3.2 |  |  |  |  | 0.9 | 1.5 |
| $C_{34}$ | Nil | 3.2 | 3.2 |  |  |  |  | 0.2 | .4 |
| $C_{36}$ | Nil | 3.2 | 3.2 |  |  |  |  |  |  |

[1] Experience shows that reactions without recycling carried out at 400 p.s.i.g. ethylene pressure would give about the same distribution as those carried out at 210 p.s.i.g.

EXAMPLE 2

In order to investigate the effect of carrying out the reaction in the presence of n-1-olefin, an experiment was made using xylene diluent containing 9 weight percent n-1-hexene. The latter was purified with small quantities of aluminum triethyl, to remove reactive impurities, hydrolyzed with water to destroy aluminum alkyl to water-soluble decomposition products, and dried over 5A $\frac{1}{16}''$ molecular sieves to obtain a purified n-hexene containing about 30 p.p.m. or less water. The reaction was carried out at 210 p.s.i.g. ethylene pressure. From the results shown in the attached Table I, it will be seen that a $C_{12}$–$C_{22}$ fraction was obtained, in 27.6 weight percent yield that is 22.5% less than that obtained by the "ordinary" reaction. It had an n-1-olefin content of about 81.8 weight percent indicating some interaction of the product during the course of the deactivation. It is obvious that if interaction did not occur, the loss of $C_{12}$–$C_{22}$ yield would be considerably lower than that of 22.5%. Thus the presence of n-1-hexene in the reacting system resulted in a displacement of product distribution to carbon numbers lower than those obtained by the "ordinary" reaction.

EXAMPLE 3

In order to investigate the effect of carbon number distribution of the "recycle" olefin on the carbon number distribution of the net reaction product, an experiment was carried out using a xylene diluent containing 14.3 weight percent of "recycle" olefin, having a carbon number range of 6 to 12 in proportions shown in Table I. An ethylene pressure of 400 p.s.i.g. was used. As shown in Table I, the reaction gave 53 weight percent of $C_{12}$–$C_{22}$ which was considerably higher than that of 38.7 weight percent found in the original experiment of the Example 1, indicating a gain of about 37%. The n-1-olefin content of this fraction was 92.3 weight percent, indicating that the lower linearity of the respective fractions found in Examples 1 and 2 was due to interaction during number range from 12 to 22. The linearity of this fraction was 98.5 weight percent. The remaining portion of the fraction was primarily Type II and Type III olefins. The remaining reaction products were olefins having a linearity of at least equal to that of the $C_{12}$–$C_{22}$ fraction.

EXAMPLE 5

A reaction similar to that of Example 4, except that the amount of reactant was increased, was carried out in the presence of a diluent containing 32 weight percent of recycle n-1-olefin. The recycle olefin was composed of 21.4 weight percent $C_6$ olefin, 45.6 weight percent $C_8$, 25.2 weight percent $C_{10}$ and 7.8 weight percent $C_{12}$. The results set forth in Table II show that the $C_{12}$–$C_{22}$ fraction comprises 59 weight percent of the product. This indicates a gain of 33.5% over the amount of this particular carbon range obtained in Example 4. The linear alpha olefin content of the $C_{12}$–$C_{22}$ fraction was 91.3 weight percent.

EXAMPLE 6

A reaction similar to that of Example 5 was carried out for 628 minutes using a diluent containing 33 weight percent of recycle n-1-olefin. The recycle olefin was composed of 24.5 weight percent $C_6$, 47.5 weight percent $C_8$ and 28 weight percent $C_{10}$. The results of this test are set forth in Table II. The $C_{12}$–$C_{22}$ olefin concentration of the product shows 62.7 weight percent and consisted of 95.1 weight percent linear alpha olefin. This example shows that increased production can be obtained in the $C_{12}$–$C_{22}$ range by omitting the $C_{12}$ fraction from the recycle olefin.

EXAMPLE 7

A reaction without recycling in accordance with Example 4 was carried out using a typical Zeigler catalyst composition consisting of 0.7 grams of diethylaluminum chloride plus an ethylaluminum dichloride mixed in the molar ratio of 1:2 and reacted with titanium tetrachloride in the molar ratio of 0.67 based on the aluminum alkyl blend. The reaction was carried out at 36° F., 500 p.s.i.g. ethylene pressure for 120 minutes. The results are set forth in Table II. It will be seen that the yield of $C_{12}$–$C_{22}$ was 38 weight percent of the total and contained 93.7 weight percent of the linear alpha olefins.

EXAMPLE 8

The reaction of Example 7 was carried out using a xylene diluent using 31 weight percent recycle olefin. The recycle olefin consisted of the following weights of linear alpha olefins: 28.5 weight percent $C_6$, 44.5 weight percent $C_8$, 27 weight percent $C_{10}$. The results of the reaction are set forth in Table II. This reaction gave 47.9 weight percent of $C_{12}$–$C_{22}$ linear alpha olefin. The linearity of the above fraction was about 90 weight percent. The linearity of the product here is lower than the linearity obtained in the other recycle examples. This would indicate that under recycling conditions, the extent of both selectivity and linearity of the optimized fraction ($C_{12}$–$C_{22}$) depends upon the form of the catalyst used.

U.S. Pat. No. 2,658,932, which shows that the olefin types are as follows:

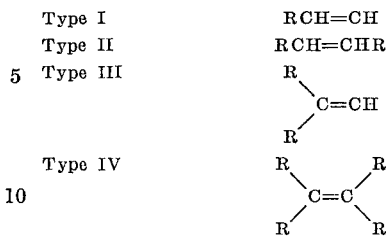

Type I          RCH=CH
Type II         RCH=CHR
Type III
Type IV wherein the R's may be the same or different hydrocarbon or substituted hydrocarbon radicals.

What is claimed is:

1. In a process for preparing a selective carbon range fraction of linear alpha olefin polymers which comprises polymerizing an ethylene containing gas in the presence of a minor amount of a catalyst comprising (1) alkyl compounds of a metal selected from Groups I to III of the Periodic Table, (2) a halide of a metal selected from

TABLE II

| Example Number | 4 | 5 | 6 | 7 | 8 |
|---|---|---|---|---|---|
| Aluminum alkyl | $(C_2H_5)_3Al$ | $(C_2H_5)_3Al$ | $(C_2H_5)_3Al$ | 1.00 $Et_2AlCl$+ 2.00 $EtAlCl_2$ | 1.00 $Et_2AlCl$+ 2.00 $EtAlCl_2$ |
| Amount, grams | 0.4 | 0.43×15 | 0.43×15 | 0.70 | 0.70 |
| Diluent to catalyst, weight ratio | 870 | 880 | 880 | 500 | 500 |
| Cl-MCP/aluminum alkyl, mole ratio | 1.86 | 1.86 | 1.86 | | |
| $TiCl_4$/aluminum alkyl, mole ratio | 0.50 | 0.50 | 0.50 | 0.67 | 0.67 |
| Ferrocene/aluminum alkyl, mole ratio | 0.32 | 0.24 | 0.24 | | |
| Reaction temp., °F | 15 | 15 | 15 | 36 | 36 |
| Reaction pressure, p.s.i.g | 400 | 400 | 400 | 500 | 500 |
| Reaction time, minutes | 240 | 240 | 628 | 120 | 120 |
| Recycle olefin in diluent, wt. percent | Nil | 32 | 33 | Nil | 31 |
| Composition of recycle n-1-olefin, wt. percent: | | | | | |
| $C_6$ | | 21.4 | 24.5 | | 28.5 |
| $C_8$ | | 45.6 | 47.5 | | 44.5 |
| $C_{10}$ | | 25.2 | 28.0 | | 27.0 |
| $C_{12}$ | | 7.8 | | | |
| Net xylene soluble product distribution: | | | | | |
| $C_4$ | .7 | | | 10.1 | 9.2 |
| $C_6$ | 6.8 | 14.4 | | 14.9 | 10.9 |
| $C_8$ | 6.8 | 4.0 | | 15.0 | 10.1 |
| $C_{10}$ | 9.5 | 4.4 | | 13.6 | 12.6 |
| $C_{12}$ | 8.7 | 6.8 | 11.3 | 11.4 | 12.8 |
| $C_{14}$ | 8.3 | 14.5 | 11.3 | 8.2 | 10.9 |
| $C_{16}$ | 8.2 | 14.5 | 13.1 | 6.9 | 8.5 |
| $C_{18}$ | 6.8 | 9.2 | 9.6 | 5.1 | 6.7 |
| $C_{20}$ | 6.8 | 7.7 | 8.7 | 3.5 | 5.3 |
| $C_{22}$ | 5.4 | 6.3 | 8.7 | 2.9 | 3.7 |
| $C_{24}$ | 4.1 | 4.8 | 7.0 | 2.1 | 2.9 |
| $C_{26}$ | 4.1 | 3.9 | 6.1 | 1.4 | 2.2 |
| $C_{28}$ | 2.7 | 2.9 | 5.2 | .9 | 1.4 |
| $C_{30}$ | 2.7 | 2.5 | 4.3 | .6 | 1.0 |
| $C_{32}$ | 2.7 | 1.6 | 3.5 | .3 | .7 |
| $C_{34}$ | 1.4 | 1.1 | 3.5 | .2 | .3 |
| $C_{36}$ | 1.4 | 1.0 | 2.6 | .2 | .3 |
| $C_{38}$ | 1.4 | 0.5 | 2.6 | .1 | .1 |
| $C_{40}$ | 3.6($C_{40}$+) | | | .1($C_{40}$+) | .1 |
| Yield of $C_{12}$–$C_{22}$, wt. percent on total | 44.2 | 59.0 | 62.7 | 38.0 | 47.9 |
| Xylene soluble net product gain in $C_{12}$–$C_{22}$ yield, based on that of the reaction without recycling | | 33.5 | 41.8 | | 26.0 |
| Linearity of the $C_{12}$–$C_{22}$ fraction | 98.5 | 91.3 | 95.1 | 93.7 | 89.6 |
| Total xylene soluble olefin wt. percent on total xylene soluble reaction mixture | 7.2 | 39.6 | 40.7 | 47.6 | 51.0 |

In carrying out the foregoing examples, it is presumed that maximum selectivity would correspond to minimum total $C_8$ and $C_{10}$ linear alpha olefins in the reaction mixture. Where the concentrations of total $C_8$ and $C_{10}$ expressed in relation to xylene diluent weight ratio were plotted against the reaction time, it was found that after ninety minutes of reaction time the concentration index decreased from 210 initially charged as recycle of up to 197 indicating not only an absence of formation but even of consumption of this particular olefin. The minimum concentration index observed during the course of reaction was that of 195, corresponding to a reaction time of about 320 minutes. This reaction time of 320 minutes is critical, since the consumption of the $C_8$ component of the recycle olefin was at a minimum. It was concluded that the reaction time corresponding to a minimum concentration of olefins having carbon numbers equal to those of the recycle olefin would result in a maximum reaction selectivity to the desired carbon number range.

The references to the olefin types used herein are those well known to the prior art as set forth, for instance, in the group consisting of Ti, Zr, V, Cr, Mo, W and Fe, and (3) a material selected from the group consisting of tertiary halides of the general formula

and secondary halides of the general formula

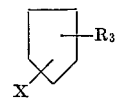

wherein R, $R_1$ and $R_2$ are hydrocarbon radicals, $R_3$ is an alkyl group containing from 1 to 10 carbon atoms, and X is a halogen, in a substantially inert aromatic hydrocarbon diluent at a temperature in the range of −130° F. to +130° F. and a pressure in the range of 100 to 2,000 p.s.i.g. for a time sufficient to recover said linear alpha olefin polymers, wherein the improvement comprises conducting the process in the presence of a selected fraction of recycled olefin, said selected fraction being selected from the group consisting of $C_6$, $C_8$, $C_{10}$ and $C_{12}$ olefins and mixtures thereof.

2. A process of claim 1 wherein the reaction is carried out in the additional presence of a metallocene.

3. A process as in claim 1 wherein said diluent contains 10 to 90 weight percent of recycle olefin.

4. A process as in claim 1 wherein said diluent contains 25 to 50 weight percent of recycle olefin.

5. A process as in claim 1 wherein said olefin comprises $C_6$ to $C_{10}$ olefins.

6. A process as in claim 1 wherein component (2) of the catalyst system is a halide of titanium.

7. A process as in claim 1 wherein component (2) of the catalyst system is $TiCl_4$.

8. A process as in claim 1 wherein said secondary halide is mono chloro methyl cyclopentane.

9. A process as in claim 1 wherein component (1) of the catalyst system is an alkyl metal hydride, said metal being selected from Groups II to III of the Periodic Table.

References Cited

UNITED STATES PATENTS

| | | | |
|---|---|---|---|
| 2,969,408 | 1/1961 | Nowlin et al. | 260—683.15 |
| 2,993,942 | 7/1961 | White et al. | 260—683.15 |
| 3,094,568 | 6/1963 | Hay et al. | 260—671 |
| 3,097,246 | 7/1963 | Fauis | 260—671 |
| 3,160,672 | 12/1964 | Pearson et al. | 260—683.15 |
| 3,227,773 | 1/1966 | Roming | 260—683.15 |
| 3,334,079 | 8/1967 | Raich | 260—93.7 |
| 3,441,630 | 4/1969 | Langer et al. | 260—683.15 |

PAUL M. COUGHLAN, Jr., Primary Examiner